Figures 1, 2:
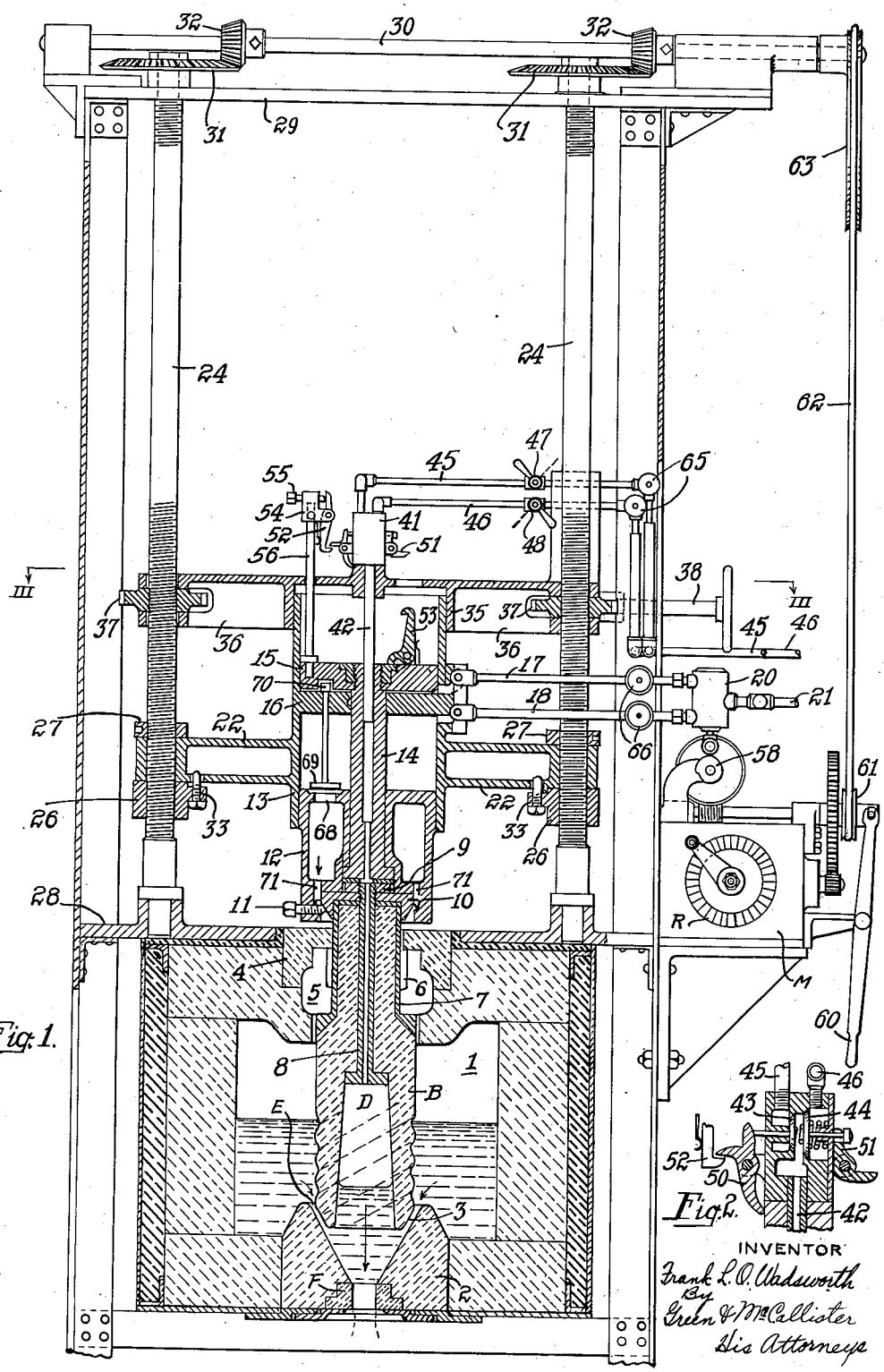

Sept. 27, 1938.  F. L. O. WADSWORTH  2,131,242
HYDRODYNAMIC BALANCE FEEDER AND METHOD OF FEEDING MOLTEN GLASS
Original Filed Feb. 11, 1933  2 Sheets-Sheet 1

INVENTOR
Frank L. O. Wadsworth
By Green & McCallister
His Attorneys

Sept. 27, 1938.  F. L. O. WADSWORTH  2,131,242
HYDRODYNAMIC BALANCE FEEDER AND METHOD OF FEEDING MOLTEN GLASS
Original Filed Feb. 11, 1933  2 Sheets-Sheet 2
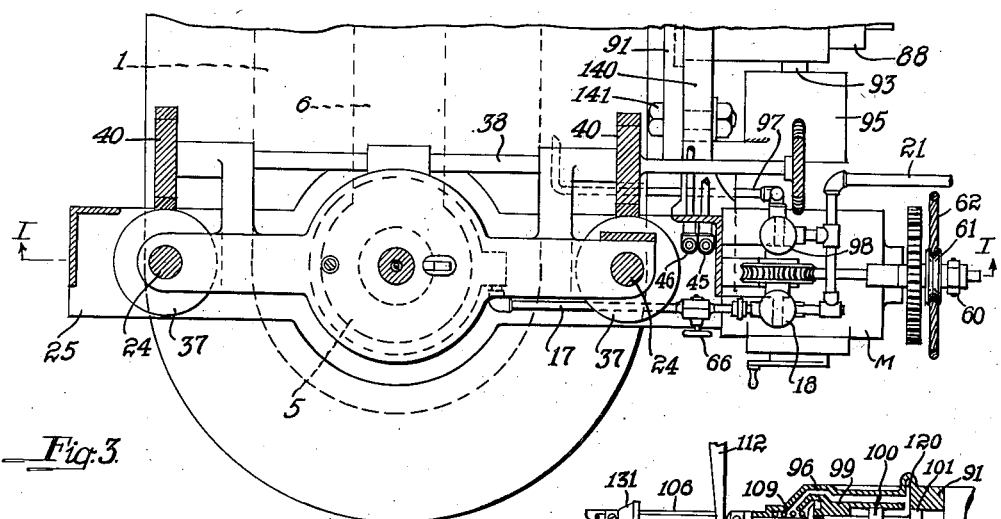
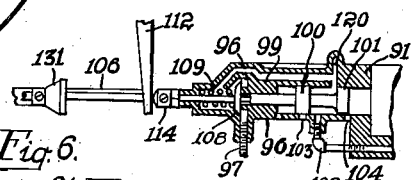
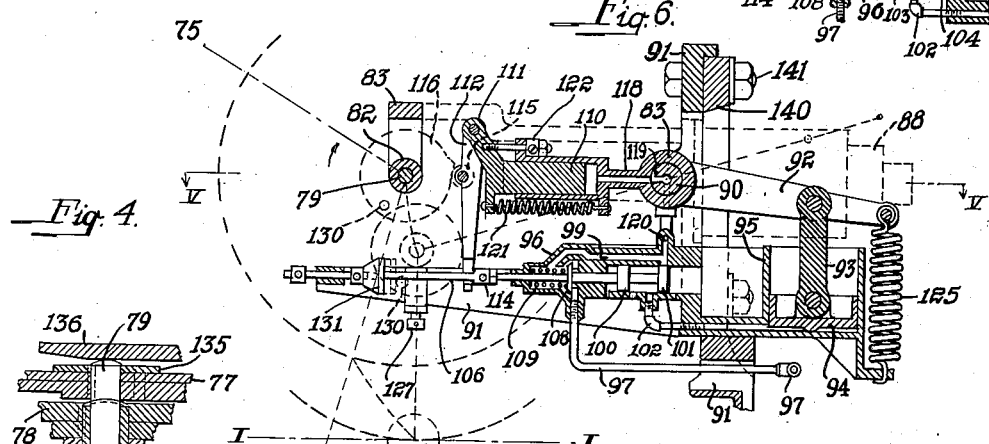
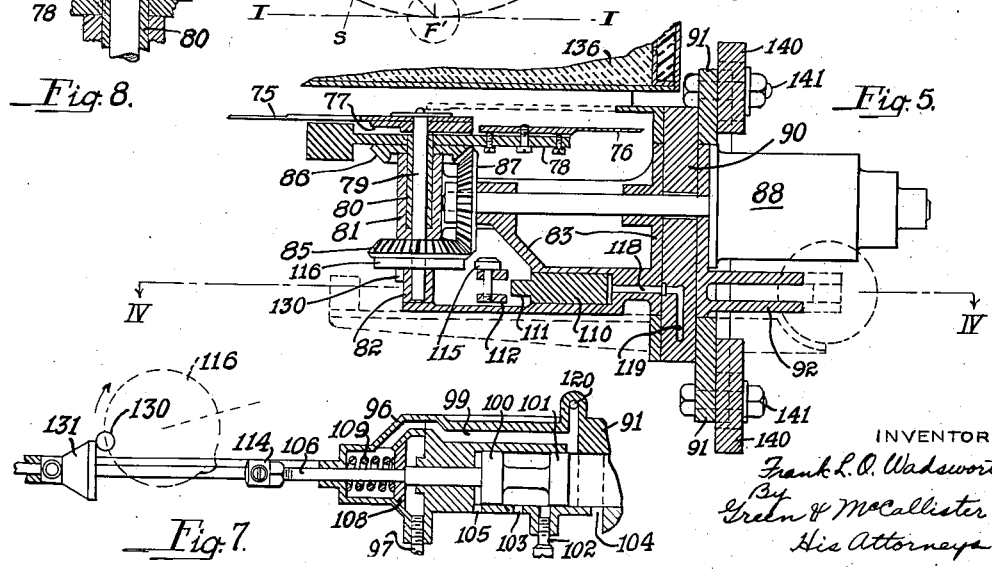
INVENTOR
Frank L. O. Wadsworth
By Green & McCallister
His Attorneys Patented Sept. 27, 1938

2,131,242

UNITED STATES PATENT OFFICE 2,131,242

HYDRODYNAMIC BALANCE FEEDER AND METHOD OF FEEDING MOLTEN GLASS

Frank L. O. Wadsworth, Pittsburgh, Pa., assignor to Ball Brothers Company, Muncie, Ind., a corporation of Indiana Continuation of application Serial No. 656,306, February 11, 1933. This application July 19, 1935, Serial No. 32,774

24 Claims. (Cl. 49—55)

My invention relates to automatic glass feeders of the hydrodynamic balance-continuous-flow type which is described in my copending application Serial No. 653,081, filed January 23, 1933, and is a continuation of an earlier application Serial No. 656,306, filed February 11, 1933; and one of the special objects of this invention is to provide for the establishment and confinement of a definite quantity or mass of elastic fluid in the balance chamber of the apparatus at two predetermined intervals in each complete cycle of its operation. More specifically stated my present improvements comprise the use of an inverted bell or cup, whose lower edge is immersed in a body of molten glass, and which is adapted to be periodically reciprocated, and alternately moved toward and away from a submerged delivery orifice in the floor of the glass holding receptacle; and of automatically actuated means for momentarily equalizing the pressure of the air, which is confined in the upper part of the inverted bell or cup chamber (above the glass), with that of an outside body of fluid, at two predetermined positions of the reciprocating implement; and thereby obtaining a double or dual control of the hydrodynamic balance forces which act to vary and regulate the flow of glass from the delivery orifice. This provision for periodically establishing a connection between the air chamber of the bell and an outside source of fluid pressure, at two different points in the up and down movement of the said bell—and thereby establishing at each of those points of connection, a fixed relationship between the volume and the mass of the confined body of gas in the bell chamber—differentiates the form of feeder herein described and claimed from that disclosed in said earlier application Ser. No. 653,081, in which this equalization connection is effected at only one point in the reciprocatory movement.

Another particular object and purpose of this invention is the provision of an improved form of "superspeed" cutting mechanism, in which the two shear blades revolve continuously in opposite directions and are periodically projected into, and withdrawn from, the path of the outflowing stream of glass to instantaneously cut off successive mold charges therefrom, and deliver them to the receptacles on the forming machine.

Other special objects of the present improvements will be rendered apparent, to those skilled in this art, by the following description of one illustrative form of my "dual balance" feeder organization, that is depicted in the accompanying drawings, in which:

Figure 1 is a partial front elevation, and a partial transverse section through the central vertical plane of the delivery orifice (i. e., the plane I—I of Figs. 3 and 4) of the feeder; Fig. 2 is an enlarged section (on the same plane) of a portion of this construction; Fig. 3 is a horizontal section on the plane III—III of Fig. 1; Fig. 4 is another horizontal section, on the plane IV—IV passing through the lower part of my improved shear mechanism (see Fig. 5); Fig. 5 is a vertical section (partly in elevation) on the plane V—V of Fig. 4; and Figs. 6, 7, and 8 are sectional views showing certain parts of the shear mechanism in other positions.

In the form of apparatus shown in these drawings, the parent body of molten glass is contained in a suitable "dog house", or forehearth chamber, 1, which extends out from the front or "fining" end of a larger tank (not here shown), and which is provided, near its forward extremity, with a removable bottom block 2, that is raised slightly above the floor of the chamber 1; and is adapted to itself support the usual form of flow ring or bushing F, from which the glass is delivered to the forming mechanism.

The vertically reciprocable bell B, which contains the segregation and hydrodynamic balance chamber of the feeder, is mounted directly above, and in line with the axis of, the flow orifice F, and is preferably provided with a beveled end 3, which is adapted to enter the correspondingly coned opening in the upper portion of the raised floor block 2, and cooperate therewith in controlling the flow of glass from the forehearth 1 into the frusto-conical chamber D in the bell B. The upper end of this bell is preferably reduced in diameter, and passes upward through an annular guard ring 4, in the roof of the chamber 1; and the annular space 5, which is left between the lower end of this ring and the reduced part of the bell member, is connected, by a flue 6, with a suitable stack or chimney which will serve to lead away the hot gases which enter the space 5, and thus retard or prevent their escape and impingement against the superadjacent parts of the construction.

The reciprocable member B may be of any suitable material, which will be resistant to the action of the molten glass—and to the high temperature in the forehearth chamber—but for practical reasons it is usually made of clay; and when so made, it may advantageously be reinforced by an outer flanged sleeve 7, of nichrome or "Fahrite", and a central tubular bolt 8, of similar high resistivity alloy, which are clamped in position, on the clay body, by a nut 9 and a sleeve washer or head 10. The outer edge of the head 10 is coned, and is engaged by a set of three or more circumferentially disposed set screws 11, which, when tightened, clamp the bell assembly against the lower end of an elongated piston member 12, that forms a part of the actuating mechanism for the bell.

The piston element 12 is mounted in the lower part of the double open ended cylinder 13 and is connected, by the hollow piston rod 14, with a second piston 15, which is positioned above the central cross head 16 of the cylinder 13. The upper and lower piston chambers are respectively connected, by the pipes 17—18, with a timer valve cylinder 20, which is supplied with compressed air from a conduit 21, and which is also provided with exhaust ports of the usual form; the general construction of these timer valve mechanisms being so well known that it is unnecessary to describe it in detail.

The cylinder member 13—16 is provided with laterally extending box girder arms, 22—22, which are bored, at their outer ends, to slide freely up and down on the vertical screw members, 24—24, and which may be locked, in any desired position on these screws by the threaded nuts 26—26, 27—27. The screws 24—24 are rotatably mounted in the upper and lower cross struts 28—29, of the structural steel framework, which supports the metal "boot" of the forehearth and the other parts of the feeder mechanism; and they are cross connected, at the top, by the transverse shaft 30, and the co-engaged bevel gears and pinions 31—31, 32—32. The lower pair of lock nuts, 26—26, are prevented from turning by dowel pin connections 33; and when the upper lock nuts, 27—27, are loosened, the entire cylinder frame may be raised and lowered by revolving the pinion shaft 30.

The cylinder member 13 is also provided with an upper head 35, which is carried by a pair of U-shaped arms 36—36, whose outer ends are also bored to slide freely up and down on the screw rods 24—24; and which is held in the desired position with respect to its supports, by a pair of threaded gears 37—37, that are embraced by the forked extremities of the arms 36—36. The gears 37—37 are cross connected, for concurrent rotation, by the transverse shaft 38 and the helical gears 40—40. When the screws 24—24 are revolved (by the action of the shaft and pinion connections 30—31—32, etc.), the head 35 will be moved up and down with the cylinder frame, 13—16—22, etc.; but this head may also be adjusted vertically—with respect to the cylinder—by an independent rotation of the shaft and gear elements 38—40—40.

The cylinder head 35 carries a valve box 41, which has an internal construction that is best shown in the enlarged cross sectional view of Fig. 2, and which is connected with the hollow piston rod 14 by a small pipe connection 42 that is slidably engaged with the bore of the said rod 14. This box contains two poppet valve elements 43—44, that serve respectively to open or close communication between the pipe connection 42, and the two pipe connections 45—46, which lead to two independent sources of preadjusted sub-atmospheric and super-atmospheric pressure; but which may also be opened, separately or concurrently to the external air by means of the two two-way cocks 47—48.

The valves 43—44 are actuated, at predetermined times in the reciprocatory movement of the connected bell and piston members, B—12—14—15, by the tappet levers 50—51, which are engaged by the pawl elements 52—53 that are mounted on and move with the upper piston head 15; the construction and arrangement of these cooperating parts being such that on the downward movement of the piston the pawl 52 rides back and over the adjacent end of the tappet lever 50, without moving the latter, and on the reverse upward movement it engages and moves this lever—and opens the valve 43—by an amount that can be varied by the adjustment of the screw 55. The pawl frame 54 is also adjustably mounted on its support 56, and by moving this up or down, the time at which the valve 43 is opened—on the up stroke of the bell B—can be correspondingly altered. The action of the pawl 53, on the lever 51, and the valve 44, is similar to that of the pawl 52 on the lever 50; but in this case no adjustments are provided for altering either the extent or the time of opening the last-mentioned valve (44) on the down stroke of the bell B.

The moving elements of the timer valve member 20 are actuated in the usual way, by a timer cam 58 which is driven, at a controllable speed, from a suitable variable speed motor M; and this motor may also be used, when desired, to operate the overhead pinion shaft 30, through the manually operable clutch 60, and the sheave and rope connections 61—62—63.

The operation of that portion of my improved feeder organization which has been described above, is as follows:

When compressed air is admitted to the upper end of the cylinder 13—through the pipe connection 17—the double ended piston members 12—14—15, and the bell B carried thereby, are moved upwardly; and in the initial part of this movement, the valve 43 is momentarily opened and then closed; thus establishing at a predetermined point in the lifting of the bell, a definite pressure (viz, the pressure in the pipe connection 45) in the segregation chamber D. The establishment of this definite pressure, at this predetermined point, tends in turn to concurrently establish a definite relation between the level of the glass within the bell B and the fixed level in the surrounding forehearth chamber; and the subsequent closing of the valve 43—as the upward movement continues—traps a definite predetermined quantity of the elastic fluid above the surface of the segregated mass of molten material. The further upward movement of the bell tends to expand this confined body of elastic fluid, and this in turn causes the glass to rise in the chamber D—to maintain a condition of hydrodynamic balance—the rapidity and the extent of this rise being dependent in part on the viscosity of the molten glass and the speed of upward movement, and in part on the constantly increasing ratio between the area of the delivery orifice F and the area of the passageway (E) between the lower end of the bell B and the adjacent surface of the floor block 2.

When the connected bell and piston members have reached the upper end of their stroke—which is limited and determined by the engagement of the upper piston member 15 with the central hub of the head 35—the pressure in the segregation chamber (D) will be a minimum, and the corresponding level of the glass therein will be a maximum; and under these conditions the flow of material from the delivery orifice— which is now in free and open communication with the parent body of molten glass in the forehearth chamber—will be controlled only by the action of gravity. If now the movement of the bell is reversed (by the action of the timer valve 20 in admitting compressed air to the pipe connection 18, and in concurrently opening the connection 17 to the atmosphere) the initial downward movement will momentarily open the valve 44; and thus establish, at another definite point in the cycle of operations, a second predetermined pressure in the segregation chamber (to wit, the pressure in the pipe connection 46); and the subsequent closure of this valve, as the downward movement continues, will again trap a fixed mass of elastic fluid above the glass in the bell at its upper level. The further downward movement of the reciprocating members will tend to compress this confined fluid, and correspondingly lower the level of the segregated mass of glass on which it acts; and will also concurrently reduce the area of the passageway E and thereby increase the resistance to the back flow of glass into the forehearth chamber; and the joint effect of these two correlated actions will accelerate the discharge of molten material from the delivery orifice F, and swell or "stuff" the stream of outflowing glass. The viscosity of the molten material will cause a lag in the downward movement of the glass within the bell—as compared with the movement of the bell itself—and this will result in a progressive increase in the pressure in the segregation chamber, which will normally reach a maximum at the lowest point in the stroke, and will continue to exert an expulsion or extrusive force on the outflowing stream after the movement has been arrested.

The succeeding upward movement of the member B will reduce or partially relieve this extrusive action, first by increasing the area of the supply passage E (thus permitting a part of this effect to be exerted on the surrounding glass in the forehearth) and next by the momentary opening of the valve 43, and the re-equalization of the pressure in the chamber D with that in the pipe connection 45; and the discharge of glass from the delivery orifice F will be correspondingly reduced, thus producing a temporary "natural necking" of the outflowing stream. But I preferably so adjust the relationship of the parts, B—2 and 50—52, and so control the predetermined pressure in the pipe line 45, that the outflow of glass is never completely arrested during the upward movement of the bell B; but always continues at a substantial rate under the influence of gravity alone; the object of this continued, or non-arrested, flow being to increase the average rate of discharge per unit of time, and thus increase the delivery capacity of the feeder without any abnormal or excessive swelling of the stream during the intervals of accelerated flow.

The lower limit of travel of the bell—which determines the area of the supply passage E at the lowest point in the stroke—can be easily adjusted, while the feeder is in operation, by a manual manipulation of the rope belt 62—which will raise or lower the entire cylinder-piston-assembly—and the upper limit of that travel may be independently adjusted by the manual rotation of the cross shaft 38 (which raises or lowers the cap 35); and the time, and the duration, of the opening of the valve 43 may be varied as desired in the manner already explained. The two predetermined pressures in the segregation chamber—at the two predetermined points in the bell movement—may likewise be regulated by the established pressures in the pipe line connections 45 and 46 (and to some degree also by the two throttle valve controls, 65—65, therein); or one or both of these pressures may be equalized with that of the outside air by the proper setting of the two-way cocks 47 and 48.

The speed of the up and down movements of the reciprocating bell may also be varied and controlled by the pressure in the compressed air line 21, and by the independent adjustment of the two swiveling throttle valves 66, 66 in the pipe connections 17 and 18; and the number of complete reciprocations per minute may be regulated by the hand rheostat R on the motor M.

In Fig. 1, I have also shown a convenient means for cooling the lower end of the piston member 12, and the adjacent metal members 9, 10 and 11, by the use of the exhaust from the lower piston chamber. In order to accomplish this, I make the lower piston member hollow, and provide its upper wall with an exhaust port 68, that is covered by a disc valve 69, the stem of which extends upwardly through the central cross wall 16 of the cylinder 13, and terminates in a small head 70. When the piston members 12—14—15, are moving upwardly the disc 69 is held against its seat by the frictional resistance to the movement of the valve stem through its bearing in the cross wall 16; and when compressed air is admitted to the lower piston chamber (through the pipe connection 18) the disc is held closed by this pressure, until the concurrent downward movement of the piston-valve-elements 12—69 brings the head 70 into mechanical engagement with the wall 16. The final downward movement of the piston assembly—which is limited by the engagement of the upper piston 15 with the cross wall 16— then opens the exhaust port 68, and permits the compressed air in the lower piston chamber to rush out, through the hollow piston 12 and the ring of ports 71—71 in the lower head thereof, and thus materially assist in protecting these parts against the action of any hot gases which may escape past the guard ring 4.

The preferred mode of operation which has been described materially reduces the amount of natural "necking" or contraction of steam diameter, during the initial upward movement of the bell B, and in order to sever this stream without arresting its continuous flow, and without subjecting it to any appreciable cooling effect during such cutting action, I have provided, as another feature of my improved feeder construction, a novel type of high speed, or "superspeed" shear mechanism which is adapted to effect the severance in a very small fraction of the time usually required for such operations. One embodiment of this feature of my improvements is illustrated in Figs. 4 to 8 of the accompanying drawings. In the construction here shown the two shear blades 75—76 (which may be either of the straight blade, or of the usual notched blade, "cat's eye" form) are removably attached to two arms 77 and 78 that are respectively keyed to a central vertical shaft 79 and an outer tubular sleeve 80, which are mounted to revolve concentrically in the bearing members 81 and 82 of a U-shaped frame 83. The connected members, 75—77—79, and 76—78—80 are continuously rotated in opposite directions, at the same angular speed, by two bevel pinions 85 and 86 (that are secured respectively to the shaft 79 and the sleeve member 80), and an interposed bevel gear 87 that is driven by the motor 88.

The member 83—which forms a common unit support for all of the above-described elements of the shear mechanism—is adapted to rock, or swing, on a vertical trunnion member 90, that is carried by the open stem portion of a T-shaped frame 91; and is provided with a forked arm 92 which is coupled, by the link 93, to the piston member 94 of a cylinder 95 that is supported on the head portion of this frame. The oppositely extending side of the T head carries a valve box 96, in which is mounted a reciprocable double piston valve, 100—101, that serves to control the admission and exhaust of air to and from the cylinder 95, and the resultant angular movement of the shear supporting frame 83. This control is effected as follows:

The front chamber of the valve box 96 is connected to the compressed air line 21 through a pipe 97, and a timer valve assembly 98 that is actuated by a cam on the same shaft that carries the timer valve cam 58 (see Figs. 1 and 3). A port 99 leads from this part of the box 96 to the rear chamber in which the piston valve elements 100—101 are located; and a second port and pipe connection 102 leads from the central part of this chamber to the rear end of the cylinder 95. The piston valve chamber is also provided with two exhaust ports 103 and 104 (see enlarged view of Fig. 7)—which are positioned on opposite sides of the head 101—and with a vent port 105 that is located in front of the head 100. The stem 106 of the piston valve member, 100—101, is reduced in diameter at the point where it enters the front chamber; and a disc valve element 108 is slidably mounted on this reduced portion, and is normally held in open position (against the adjacent face of the front chamber of the valve box) by the spring 109.

The lower part of the swinging frame support 83 is bored to receive a piston member 110 that is provided at its front end with an arm or lug 111, which forms a pivot support for a forked lever 112. The two arms of this lever are thickened or brought together, at their outer ends to form a narrow slot through which the piston valve stem 106 passes; and this stem carries an adjustable collar 114 that is adapted to be engaged by the thickened ends of the lever arms. The upper arm of the lever 112 carries a cam roller 115, which is adapted to engage with a cam disc 116 on the bevel pinion 85, when the piston 110 is moved forward to the position shown in Fig. 4.

The rear end of the piston (110) cylinder is connected to the port 99 by the passageways 118—119 and 120, which are formed in the hub of the swinging frame 83 and the stationary trunnion supports 90 and 91. The piston 110 is normally held in its retracted position—with the cam roller 115 out of engagement with the cam disc 116—by a spring 121; and an adjustable stop member 122 is provided to limit its forward movement. A second spring 125 which is attached to the end of the forked arm 92, serves to normally hold the shear supporting frame 83 in the full line position shown in Figs. 4 and 5; and in this position the path of movement of the shear blades does not intersect the line of flow of the glass stream.

When it is desired to effect a severing operation, compressed air is admitted to the line 97 by the action of the timer valve 98; but is prevented from reaching the cylinder 95 by the piston valve head 101, until the latter has been moved from the position shown in Fig. 4 to that shown in Fig. 6. This movement—which must be so timed that the continuously revolving shear blades meet and pass each other on the axis of the flowing stream—is effected by the piston-lever-cam elements 110—112—115—116. The admission of compressed air to the line 97, and the front chamber of the valve box 96—and thence to the ports and passageways 99—120, etc.—moves the piston 110 forward and brings the cam roller 115 into contact with the cam disc 116. The parts are so arranged and adjusted that the lobe of this cam—which is revolving clockwise as viewed in Fig. 4—engages the roller 115 at the time when the two shear blades have moved from the position shown in full lines in Fig. 5 (where the axis of one blade (75)—79, and the axis of the other (i. e., 76) is in the plane V—V) to the crossing position indicated by the dotted line 79—S; and when this engagement occurs, the lever 112 is rocked to the right and moves the piston valve elements 100—101 to the full line position of Fig. 6. This movement closes the exhaust port 103, and permits the compressed air to pass from the port 99 to the port 102 and to the rear of the piston 94. This immediately swings the shear frame assembly forwardly until it meets the adjustable stop 127 on the frame 91, and the next revolution of the shear arms will cause the shear blades to meet and cross on the axis F (in the plane I—I) of the flowing stream, and almost instantaneously sever the latter. As indicative of the very short interval required in this cutting operation, let us assume—as here shown—that the effective radius of action is approximately 7.5 inches and that the speed of revolution is 1200 R. P. M. (20 R. P. S.). The linear speed of each blade is then about 950 inches per second; and the time required to sever a two inch diameter stream is only a little more than 0.001 second.

After each severance it is, of course, necessary to immediately swing the shear frame back from its operative position; and this may be effected in the following manner: The cam disc 116 is provided, on its lower side, with a pin or roller 130, and the valve stem 106 with an adjustable cam block 131; and these cooperating elements (130—131) are so positioned that as the shear blades meet and cross, on the axis F', the pin engages the block 131 and moves the valve elements 100—101 to the left and into the position shown in Fig. 7, this movement being sufficient to also close the disc valve 108 against the pressure of the spring 109. This movement shuts off the flow of compressed air to the port 99 and opens both of the exhaust ports 103 and 104, thus permitting the piston members 94 and 110 to be immediately retracted, by the action of the springs 125 and 121. The valve elements 100—101—108 will, however, be held in their last-described position, by the pressure of the compressed air on the face of the disc valve 108, until the timer valve 98 acts to open the line 97 to the atmosphere; and when this occurs, the spring 109 will return the valve parts to their original intermediate position (shown in Fig. 4) in readiness for the next operation.

It will be observed that the advance and the retraction of the shear blade assembly—to carry the line of movement of the blades into and away from the path of the flowing stream—is not dependent upon any exact setting or adjustment of the timer valve mechanism, but is controlled and determined (after the timer valve is actuated to admit compressed air to the line 97) by the rotation of the shear arms themselves; and that any slight irregularities or momentary changes either in the action of the timer valve cam, or in the speed of the motor 88, cannot sensibly affect the interval between successive severing operations, or the establishment of a proper registration between the rotary and the transverse movements of the cutting elements.

Since the blades of my improved "superspeed" shear mechanism are revolving continuously, and must of course cross each other twice in each revolution, it is desirable to avoid bringing them into "wiping" contact except at such times as they are engaged in severing the glass stream. I accomplish this object by interposing a light spring 135 between the adjacent faces of the arms 77 and 78 (see enlarged view of Fig. 8), and by providing a beveled end arm 136, which is supported by the frame 91, and which extends out to such a position that when the frame 83 is swung forward to cutting position the end of this arm engages the coned or rounded extremity of the shaft 79 and presses the upper shear blade arm 77 down against the lower arm 78; the shear blades themselves being so shaped and so adjusted (as shown in Fig. 5) that the cutting edges will then "ride up" on each other, at the instant of crossing, and effect a clean sharp unmarked severance of the molten material.

It is also desirable to provide for a vertical adjustment of the cutting plane with respect to the lower end of the delivery orifice F; and this result is achieved in the construction herein shown, by bolting the stem of the T-shaped frame 91 against the face of a bracket 140, which is rigidly mounted on one of the heavy angle posts that support the entire forehearth and feeder structure (see Figs. 1, 3, and 4). This bracket is provided with a central opening in which the motor 88 and the arm 92 may swing freely; and it is slotted vertically to receive four cap or stud bolts 141—141, etc., which are rigidly secured in the frame 91 and which may be used to clamp the latter in the desired position on the bracket 140. The purpose of this "shear height adjustment" and the beneficial results which may be obtained thereby, have been explained in my earlier Patents No. 1,311,474 (see lines 60–89, p. 1) and No. 1,334,745 (see lines 68–105, page 2); and the particular advantages of providing such an adjustment in connection with my hereinbefore described form of apparatus will be readily appreciated by those skilled in this art.

It will be understood that the mode or method of operation which characterizes my improved type of hydrodynamic balance feeder does not depend upon any adhesion of the glass to the surface of a reciprocating implement (as in the case of the "sticky plunger" feeder); and that the reciprocating bell B (or its equivalent) may be made of a material to which the molten glass will not adhere, without affecting its desired action. It will also be understood that the operation of this improved type of feeder does not involve any continued flow of air (or other fluid) to and from a pneumatic pressure chamber (as in the case of the Hitchcock-McCauley type of air feeder); nor does it require the use of auxiliary pumps, or other means, for maintaining such flow. The bell itself, and the molten mass of glass segregated therein, together form the cylinder and piston elements of a "pump" which acts to supplement the effect of gravity in alternately expelling the glass from the segregation or balance chamber, and then refilling it from the parent body of molten material. My improved mode of procedure is further characterized by the maintenance of a constant or unvaried area of opening through the discharge outlet—i. e., this outlet is never "throttled" or obstructed by the lower end of a reciprocating implement, or "obturator"—and by a periodic increase and decrease in the area of the supply passage leading from the main body of glass to the segregation chamber. This progressive change in the ratio between the areas of these two passages (the delivery and the supply openings) cooperates with the progressive changes of pressure within the bell chamber—which are themselves dependent only on the bell movement—in periodically accelerating the extrusion of the glass from the delivery orifice during the downward movement, and in continuing this accelerated discharge after this movement has been arrested; and in also hastening the flow of glass from the surrounding body of material to the segregation chamber when the upward movement begins. In these respects the operations of my hydrodynamic balance feeders differ materially from that of the reciprocating "plunger" feeder and also from that of the pneumatic impulse (pressure and vacuum) feeder.

The mechanical structure which is herein illustrated and described is only one of many which I have designed for practising my invention and with the present disclosure as a guide those skilled in this art can readily devise other forms of construction which will embody the whole or part of the improvements which are defined in the following claims.

What I claim is:

1. An improved method of feeding molten glass from a body thereof through an orifice submerged thereby which consists in confining a limited portion of the surface of the glass above said orifice, successively subjecting the confined surface to two elastic fluids of predetermined and different pressures at predetermined times, and progressively varying each said fluid pressure during the interval between such successive applications.

2. An improvement in the art of feeding molten glass from a parent body and through an orifice submerged thereby which consists in confining a portion of the surface of the glass above said orifice, subjecting such confined surface to two successively applied fluid pressures of predetermined but different magnitudes, progressively varying each of the pressures so applied during the intervals between their successive application to segregate glass above said orifice and to discharge such segregated glass from said orifice and varying the resistance to the return of the said segregated glass to the parent source of supply during the discharge thereof through said orifice.

3. An improvement in the art of feeding glass from a parent body of the molten material which comprises: confining a portion of the surface of said material within the interior of a reciprocating bell, alternately subjecting the surface of glass within said bell to predetermined fluid pressures of different magnitudes during the movement of the bell in opposite directions, progressively varying the pressures of the fluid within said bell during the continued movement thereof, and utilizing the variations of pressure thus produced to periodically alter the rate of flow of the glass from the bell to and through a delivery orifice adjacent thereto.

4. An improved feeder for viscous material which comprises the combination of a receptacle for said material having a delivery orifice leading therefrom, a segregation chamber positioned above said orifice, means for reciprocating said chamber to successively admit limited quantities of the said material to the said chamber, and means actuated by said chamber at substantially each end of its stroke for trapping predetermined fluid pressures therein, the continued reciprocation of said chamber being utilized to progressively vary the pressure of the said fluid during the periods between the successive admissions thereof, and thereby jointly controlling the admission of material to said chamber and its discharge therefrom.

5. An improved feeder of the class described, which comprises the combination of a container for molten material having an open well in the bottom thereof with the wall extending above the floor of said container, a reciprocable bell positioned above and adapted to enter said well, a conduit leading from the interior of said bell to two sources of fluid pressure of different magnitude, means for periodically reciprocating the said bell, and means actuated by the movement of said bell in each direction for momentarily and alternately opening said conduit to the said sources to thereby admit and trap a predetermined fluid pressure in the bell chamber.

6. An improved feeder of the character described, comprising in combination a container having a discharge orifice in the bottom thereof, a reciprocable bell positioned above said orifice, a conduit connecting the interior of said bell to different sources of fluid pressure of different magnitude, means for periodically reciprocating said bell, means operable as said bell is moving away from said orifice for momentarily connecting said conduit with one of said sources of fluid pressure to establish a predetermined pressure therein, the continued movement of said bell expanding said fluid and progressively decreasing the pressure thereof and causing a flow of glass into said bell and means operable as said bell starts moving toward said orifice for momentarily connecting said conduit to the other of said sources of fluid pressure to establish a predetermined pressure of greater magnitude therein, the continued movement of said bell toward said orifice compressing the fluid trapped therein and progressively increasing the pressure thereof whereby the flow of glass through said orifice is accelerated.

7. An improvement in the art of feeding molten glass from a submerged orifice, which consists in reciprocating a segregation chamber positioned over said orifice, establishing a predetermined fluid pressure in said segregation chamber while moving said chamber toward the orifice, continuing such movement of the chamber to progressively compress the fluid therein to thereby progressively increase the pressure thereof and augment the gravity flow through said orifice, utilizing such built up pressure to maintain a flow of glass through the orifice at the end of the down stroke and start of the up stroke of said chamber, establishing a second predetermined fluid pressure of lesser magnitude in said segregation chamber during the up stroke thereof and then continuing this upward movement to progressively expand the fluid in said chamber and decrease the pressure thereof to set up a flow of glass from the parent body to said chamber while continuing the gravity flow through said orifice.

8. The combination with a glass container having a submerged orifice, of a double open-ended cylinder on said container, a piston member having a portion slidably mounted in each end of said cylinder, a bell-shaped impeller attached to said piston and extending into said container above said orifice, means for moving said piston back and forth in said cylinder to reciprocate said impeller, means for connecting the interior of said impeller to two sources of fluid pressure, and means carried by said piston for momentarily and successively actuating said last-mentioned means.

9. The combination with a glass container having an open well in the bottom thereof with the wall extending above the floor of said container, of a double open-ended cylinder on said container, a piston-like member having a portion slidably mounted in each end of said cylinder, a bell-shaped impeller extending into said container and adapted to enter said well, a conduit leading into the interior of said impeller to two sources of fluid pressure of different magnitudes, means for moving said piston back and forth in said cylinder to raise and lower said impeller, and means adapted to be operated by said piston at each end of its stroke for momentarily opening said conduit to said sources to thereby admit and trap a predetermined quantity of elastic fluid in the impeller.

10. An improvement in the art of feeding molten glass through an orifice submerged by a body of such material which consists in segregating a quota of material from the body while maintaining a gravity flow through the orifice, periodically subjecting the surface of such segregated quota to a predetermined fluid pressure and trapping a quantity of fluid under such pressure above the segregated quota, decreasing the volume of the trapped fluid to increase the pressure thereof and expel a portion of the segregated quota through the orifice, subjecting the surface of the remaining portion of the segregated quota to a fluid pressure of less magnitude than that of fluid pressure first applied, and trapping a quantity of fluid under such pressure above the remaining portion of said segregated quota and then expanding the second trapped fluid to decrease the pressure thereof and re-establish a flow from the supply body and segregate another quota therefrom.

11. An improvement in the art of feeding molten glass through an orifice submerged by a body of such material which consists in segregating a quota of material from the body while maintaining a gravity flow therefrom through the orifice, establishing a predetermined fluid pressure above the segregated quota, varying the pressure above the segregated quota to discharge a portion thereof through the orifice while concurrently preventing a return flow from the segregated quota to the supply body, subjecting the remaining portion of such segregated quota to a predetermined fluid pressure of less magnitude than that first established above said quota and then rapidly varying this fluid pressure to segregate another quota of material from said body while concurrently re-establishing the gravity flow from the body and through the orifice.

12. An improved feeder of the class described comprising in combination a container for molten material having a delivery orifice in the bottom thereof, a bell reciprocably mounted above said orifice and in vertical alignment therewith, a cylinder and piston associated with said bell, means for moving said piston back and forth in said cylinder to reciprocate said bell, and means actuated by the movement of said piston in each direction for momentarily and alternately connecting the interior of said bell to two sources of fluid pressures of different magnitudes.

13. An improved feeder for viscous material comprising in combination a container for molten material having a delivery orifice leading therefrom, an air bell positioned above said orifice, means for reciprocating said bell, means responsive to the reciprocation of said bell for momentarily connecting the interior thereof to two sources of elastic fluid maintained under different pressures whereby limited quantities of such fluid are trapped in said bell at predetermined intervals, and means cooperating with said bell to vary the resistance of flow between the interior of said bell and the body of material within said container.

14. A glass feeder comprising a container for molten glass having a submerged discharge outlet therein, a bell extending into said container in axial alignment with said outlet, means for reciprocating said bell toward and away from said outlet to thereby vary the area of the passage between said bell and the bottom of said container, and means responsive to the reciprocation of said bell for momentarily and alternately connecting the interior thereof to two sources of elastic fluid maintained under different pressures whereby limited quantities of such fluid are trapped in said bell at predetermined intervals.

15. A glass feeder comprising a container for molten glass having a submerged discharge outlet therein, a bell extending into said container in axial alignment with said outlet, means for reciprocating said bell to move the bell toward and away from said outlet and thereby vary the area of the passage between said bell and the bottom of said container, means responsive to the movement of said bell in a direction to restrict said passage for trapping a predetermined fluid pressure therein, and means responsive to the movement of said bell in a direction to open said passage for trapping a second but different predetermined fluid pressure therein.

16. An improvement in the art of feeding glass from a parent body through an orifice submerged thereby which consists in confining a portion of the surface of the body of glass over said orifice within a reciprocating bell, establishing a predetermined fluid pressure within said bell at a predetermined point in the upstroke thereof, establishing a predetermined fluid pressure within said bell at a predeteermined point in the downstroke thereof but of greater magnitude than that established on the upstroke thereof and continuing the reciprocation of said bell to progressively vary the fluid pressures within said bell during the intervals between their successive applications.

17. The method of feeding molten glass from the parent body through an orifice submerged thereby which consists in confining a portion of the surface of the glass above said orifice within a vertically reciprocating bell, equalizing the pressure within said bell with a source of fluid pressure at a definite point in the upstroke of said bell, continuing the upward movement of said bell to vary the pressure of the fluid within said bell, equalizing the pressure within said bell with a second source of fluid pressure of greater magnitude than said first mentioned source at a definite point in the downstroke of said bell, and continuing the downward movement of said bell to vary the pressure within said bell and accelerate the flow through the orifice.

18. An improvement in the art of feeding molten glass through an orifice submerged by a body of such material, which consists in confining a portion of the surface of the glass over the orifice in a reciprocating bell, momentarily connecting the interior of said bell with a source of elastic fluid at a predetermined point in the upstroke thereof, drawing glass into said bell from said body by decreasing the pressure of the elastic fluid therein during the continued upward movement thereof, momentarily connecting the interior of said bell with a second source of elastic fluid maintained under a higher pressure than said first mentioned source at the beginning of the downstroke thereof, expelling the glass from said bell by increasing the pressure of the fluid therein during the continued downward movement thereof and concurrently restricting the flow from the supply body to the orifice and then removing the restriction from the supply body to the orifice while relieving the compression within said bell.

19. Glass feeding apparatus comprising a container having a delivery orifice in the bottom thereof, a bell reciprocably mounted above said orifice, means for reciprocating said bell, means for momentarily connecting the interior of said bell to two sources of elastic fluid maintained under different pressures in timed relation to the reciprocation of said bell, means cooperating with the mouth of said bell for varying the resistance of flow between the interior of said bell and the body of material within said container, and means for varying the relation between said last mentioned means and the mouth of said bell.

20. Glass feeding apparatus comprising a container for molten glass having a submerged discharge orifice therein, a bell projecting into said container in alignment with said orifice, a piston connected to said bell, a cylinder in which said piston reciprocates, means for delivering motive fluid to said cylinder, and means for raising and lowering said cylinder to vary the stroke of said bell.

21. Glass feeding apparatus comprising a container having a submerged delivery orifice therein, a bell projecting into said container in alignment with said orifice, a piston connected to said bell, a cylinder in which said piston reciprocates, means for raising and lowering said cylinder to vary the stroke of said bell, valvular means for momentarily connecting the interior of said bell to two sources of elastic fluid maintained under different pressures, and means for operating said valvular means in timed relation to the reciprocation of said bell.

22. Glass feeding apparatus comprising a container for molten glass having a submerged orifice therein, a bell mounted to reciprocate above said orifice, means for reciprocating said bell, a conduit for connecting the interior of said bell with two sources of elastic fluid maintained under different pressures, valves for controlling communication between the interior of said bell and the sources of elastic fluid, and means for operating said valves in timed relation to the reciprocation of said bell.

23. A glass feeding apparatus comprising a forehearth having a submerged delivery orifice therein, a bell mounted for reciprocation above said orifice, means for reciprocating said bell, a conduit connecting the interior of said bell with two sources of elastic fluid maintained under different pressures, valves for controlling communication between said conduit and each of said sources, means for operating one of said valves during the upstroke of said bell, and means for operating the other of said valves during the downstroke of said bell.

24. A glass feeding apparatus comprising a forehearth having an orifice in the bottom thereof, a bell mounted for reciprocation above said orifice, a piston attached to said bell, a cylinder in which said piston reciprocates, a pair of valves for controlling communication between the interior of said bell and two sources of elastic fluid maintained under different pressures, and means associated with said piston for operating said valves, one of said valves being momentarily opened during the upstroke of said bell and the other of said valves being momentarily opened at the beginning of the downstroke of said bell.

FRANK L. O. WADSWORTH.